(12) United States Patent
Figovsky et al.

(10) Patent No.: US 6,960,619 B2
(45) Date of Patent: Nov. 1, 2005

(54) FOAMABLE PHOTO-POLYMERIZED COMPOSITION

(75) Inventors: Oleg Figovsky, Haifa (IL); Leonid Shapovalov, Haifa (IL); Raisa Potashnikov, Migdalha-Emek (IL); Yury Tzaid, Qiryat Bialik (IL); J. Bordado, Lisboa (PT); David Letnik, Haifa (IL); Aster De Schijuer, Deurle (BE)

(73) Assignee: Acryfoam Ltd., Migdal Ha-Emek (IL)

( * ) Notice: Subject to any disclaimer, the term of this patent is extended or adjusted under 35 U.S.C. 154(b) by 484 days.

(21) Appl. No.: 10/379,821

(22) Filed: Mar. 6, 2003

(65) Prior Publication Data

US 2004/0176485 A1 Sep. 9, 2004

(51) Int. Cl.[7] ............... C08J 9/06; C08J 9/14; C08J 2/46
(52) U.S. Cl. ............ 521/150; 521/149; 521/134; 521/137; 521/160; 521/910; 522/46; 522/62; 522/65; 522/78; 522/96
(58) Field of Search ............... 522/46, 62, 65, 522/78, 96; 521/149, 150, 134, 137, 160, 910

(56) References Cited

U.S. PATENT DOCUMENTS

| 4,771,078 A | * | 9/1988 | Schisler et al. ............ 521/50.5 |
| 5,026,738 A |   | 6/1991 | Meinhard |

FOREIGN PATENT DOCUMENTS

| JP | 6073226 | 3/1994 |
| JP | 6128407 | 5/1994 |
| WO | WO 02/04200 | 7/2001 |

OTHER PUBLICATIONS

Handbook of Adhesives and Sealants, Edward M. Petrie, McGraw–Hill, pp. 390–392, 2000.
Polyurethane Sealants, Technology and Applications, Robert M. Evans, pp. 30–34, 1993.

* cited by examiner

Primary Examiner—Morton Foelak
(74) Attorney, Agent, or Firm—Blank Rome LLP

(57) ABSTRACT

Acrylic composition for use in variety of indoor or outdoor sealing applications, where it is required to seal, to fill or to repair cracks, joints, gaps etc. in concrete, masonry, stone, wood or other constructional materials.

The composition comprises acrylic based reactionable oligomers and it can be foamed and then polymerized while producing foam with structure suitable for sealing.

12 Claims, 3 Drawing Sheets

$R_1$ - alkyl, aryl
$R_2$ - alkyl, aryl, cycloaliphatic

Table 3

| | First oligomer | | Second oligomer | | Third oligomer | | Radical producing means | | Blowing agent | |
|---|---|---|---|---|---|---|---|---|---|---|
| | Name and producer | Amount | Name and producer | Amount | Name and producer | Amount | Name and producer | Amount | Name and producer | Amount |
| 1 | Polyester Tetraacrylate CN 292* Sartomer Company, Inc., USA | 43 | Urethane methacrylate H1-2 Chemonol Ltd., Israel | 5 | Polybutadiene Dimethacrylate CN 301 Sartomer Company, Inc., USA | 35 | BENACURE 651 Mayzo Inc., USA | 7 | Perkadox AIBN Azo-bis-isobutyronitrile Akzo-Nobel NV, USA | 10 |
| 2 | Trimethylol Propane Triacrylate Osaka Organic Chemical Industry Ltd. | 65 | - | - | Acrylated Polyester Adhesion Promoter CN 704 Sartomer Company, Inc., USA | 17 | BENACURE 651 Mayzo Inc., USA | 7 | Perkadox AIBN Azo-bis methylbutyronitrile Akzo-Nobel NV, USA Pentane Chem. Industry Com, Europe | 6 5 |
| 3 | Ethoxylated BisphenolA Diacrylate SR 602 Sartomer Company Inc., USA | 53 | Urethane methacrylate CH 2-2 Chemonol Ltd., Israel | 30 | - | - | SarCure SR 1129 SarCure SR 1137 Sartomer Company, Inc., USA | 4 3 | Azo-bis methylbutyronitrile AIVN Atofina Company, USA | 10 |
| 4 | Ethoxylated BisphenolA Diacrylate SR 602 Sartomer Company Inc., USA | 72 | Urethane methacrylate CH 2-2 Chemonol Ltd., Israel | 10 | - | - | SarCure SR 1129 SarCure S R 1137 Sartomer Company, Inc., USA | 4 3 | Azo-bis methylbutyronitrile AIVN Atofina Company, USA Pentane Chem. Industry Com, Europe | 7 4 |

Fig. 3

FOAMABLE PHOTO-POLYMERIZED COMPOSITION

FIELD OF THE INVENTION

The present invention relates to acrylic composition for use in variety of indoor or outdoor sealing applications, where it is required to seal, to fill or to repair cracks, joints, gaps etc. in concrete, masonry, stone, wood or other constructional materials. In particular the invention refers to a composition, which comprises acrylic based reactionable oligomers and which can be foamed and then polymerized while producing of foam structure suitable for sealing. It should be appreciated however, that the composition of the present invention is not limited merely to sealing and it can be also used in other applications, in which it is required to fill a space by a compound having foamed structure.

BACKGROUND OF THE INVENTION

Acrylic compositions are completely different, in terms of their structure and properties from linear (thermoplastic) and so-called network (cross-linked) acrylic polymers produced from high-molecular weight polyacrylates or from monomer and oligomer acrylates. Despite the fact that acrylic compositions per se are well known, nevertheless they are not used for sealing purposes as a foamable one-component product, see e.g. Edward M. Petrie, Handbook of Adhesives and Sealants, N.Y. 2000, pp.390–392. In the present specification by the one-component product is meant a composition, that contains all its ingredients within a single package (e.g. a can), and its foaming and polymerization is caused by exposing the content of the package to ambient air.

In practice various polyurethane compositions are used as such one-component foam sealants. Polyurethane one-component foam compositions have good service properties but their use is relatively limited, since they contain very toxic isocyanate components. Polyurethane sealants are especially harmful in those applications in which the sealant is applied manually, see e.g. Robert M. Evans, Polyurethane Sealants. 1993, Technonic Publishing Company, N.Y. 1993.

There are known also silicone based one-component foam sealants, however they are very expensive and in many applications their mechanical properties are not sufficient for obtaining reliable sealing, see e.g. Eduard M. Petrie, Handbook of Adhesives and Sealants, N.Y. 2000, pp. 497–498.

In practice it would be very convenient if a one-component sealant were curable by virtue of photo-polymerization induced by exposing the sealant to ambient air or to a UV or IR laser radiation.

So far, this measure has not been exploited for polymerization of foamable acrylic sealants but merely for acrylic compositions used as coatings.

A process for producing of rigid acrylic foam is disclosed in U.S. Pat. No. 5,026,738 to Stefan. According to this patent it is possible to obtain rigid foam having bulk density ranging from 50 to 100 g/l by polymerizing and foaming of acrylic acid and/or methacrylic acid compounds in the presence of catalysts and/or initiators liberating nitrogen. The polymerization process is carried out at elevated temperature and upon completing thereof the obtained foam is evacuated from a mold. Unfortunately the particular compositions mentioned in this patent are not suitable for photo-polymerization by a UV or IR laser irradiation.

In JP6073226 and JP6128407 to Yoshiaki, et al. are disclosed acrylic foam compositions based on emulsion of a (meth)acrylic ester polymer. The foamed compositions are used as soundproofing or cushioning materials. The composition disclosed in JP6073226 contains 10–99,9 wt. % of (meth)acrylic ester, 0.1–10 wt. % of a monomer containing a cross linking functional group and 0–89 wt % of a monomer which gets free from the crosslinked functional group. The compositions described in the above patents are polymerized when an emulsion of a (meth)acrylic ester polymer is prepared by mixing with water at 10–90 deg. C. for 5–15 hours in the presence of an emulsifier and a polymerization initiator. The obtained emulsion is mixed with 0.05–10 weight parts of Fluorosilicate and then is heated to 80 deg. C. for 10 minutes or longer to obtain a crosslinked foam. Unfortunately these acrylic foamable compositions are not suitable for sealing applications since they are defined by an open surface, which is required for fast and easy removal of water.

In International publication WO 0204200 to Ramesh is described pressure-sensitive adhesive foam-like tape having a backing comprising 88–92% of an acrylic polymer. This polymer contains: 35–45% of a first acrylate monomer wherein the alkyl groups contain from 4 to 12 carbon atoms, 30–40% of a second alkyl acrylate monomer of analogous structure, 6–10% of a first monoethylencally unsaturated polar copolymerizable monomer, 1–2% of a second monoethylencally unsaturated polar copolymerizable monomer, 0.3–0.5% of a photoinitiator, 1–2% of fillers, 0.05–0.07% of a crosslinker/chain extender, and 8–12 of hollow glass microspheres dispersed evenly in the polymer. The tape further comprises a pressure-sensitive adhesive layer covering at least one side of the backing. Unfortunately this composition is not suitable for use as a foam sealant, since it is curable only under pressure in the form of a thin film.

Thus despite various polymerizable compositions are known for sealing applications, nevertheless there is still felt a strong need in a new, one-component, acrylic-based, foamable composition.

SUMMARY OF THE INVENTION

The main object of the present invention is to devise a new acrylic composition suitable for use as a one-component photo-polymerizable foam sealant. The further object of the invention is to provide acrylic sealant composition, which is simple, inexpensive and is curable upon exposure to UV or IR radiation, produced by a laser.

The composition of the invention comprises polyfunctional acrylic oligomers having in their structure hydroxyl-urethane intramolecular groups. The invention also concerns a reaction, which can be used for synthesizing of oligomers employed in the composition of the invention.

In accordance with the first embodiment of the invention the composition comprises:
  a. at least two acrylic-based reactionable oligomers,
  b. at least a first and a second radical producing means, capable to liberate radicals, required for polymerization of said oligomers upon exposing the composition respectively to a light or to ambient temperature,
  c. at least a first and a second blowing agent, capable to supply a gas for foaming the liquid composition,
wherein said at least two acrylic-based reactionable oligomers comprise a first oligomer, being at least three functional oligoester provided with terminated acrylic groups and a second oligomer, being two functional oligomer provided with at least two urethane groups and at least two terminated acrylic and/or methacrylic groups, and wherein the weight ratio between the said first and said second oligomer varies between 1:0.5 to 1:0:2.

In a second embodiment the first radical producing means is selected from the group consisting of 2,4,5-trimethylbenzophenone, 4-methylbenzophenone, 2-methylbenzophenone, oligo{2-hydroxy-2-methyl-1[4-(1-methyl)phenyl]propane} and their combinations, the second radical producing means is a peroxide and said light is UV or IR light.

In a still further embodiment the first blowing agent comprises an organic substance capable to decompose at a temperature of not more than 120° C. with liberation of a gas, while the other blowing agent comprises an organic liquid, which boiling point is at least 45° C.

In yet another embodiment the first blowing agent is selected from the group consisting of 2,2'-azodi(2-methylbutyronitrile), 2,2'-azodi(isobutyronitrile), 1,1'-azobis-(cyclohemanecarbonitrile), 2,2'-azobis-(2-methylpropanenitrile), 2,2'-azobis-(2,4-dimethylpentanenitrile), 2,2'-azobis-(2-methylbutanenitrile), benzenesulfonyl hydrazide, chlorobenzenesulfulfozide, N,N'-dimethyl-N,N'-dinitrosoterephtalamide, 2,4,6-trimethylbenzophenone and their combinations, the second blowing agent is selected from the group consisting of pentane and fluorine freons.

As per further embodiment the composition comprises at least one activator, capable to promote co-polymerization of the first and the second oligomer. In accordance with the other embodiment said activator is selected from the group, consisting of an acrylic amine containing oligomer, a salt of copper, a salt of Zinc, vanadium oxide and their combination.

According to an additional embodiment the second oligomer is a product of reaction of urethane diot with metacrylic or acrylic anhydride.

In the other embodiment the urethane diol is a product of reaction of an alkylencyclocarbonate with an aliphatic or cycloaliphatic primary diamine. As per still another embodiment the composition comprises a third oligomer, capable to improve adhesion ability of the composition after it is foamed.

In yet another embodiment the third oligomer is a functional acrylic oligomer.

In a still further embodiment the said sealant is being stored in a closed container having gas medium under pressure of about 5 bars and said gas medium is distributed within the composition.

The present invention in its various embodiments has been only briefly summarized. For better understanding of the present invention as well of its advantages, reference will now be made to the following description of its embodiments with reference to the accompanying drawings.

BRIEF DESCRIPTION OF THE DRAWINGS

FIG. 3 summarizes content of the compositions in its various embodiments

DETAILED DESCRIPTION OF SPECIFIC EMBODIMENTS

The present invention relates to a composition for use as acrylic one-component foamable sealant, which can be photo-polymerized by exposing thereof to UN or IR radiation produced for example by a laser. The composition comprises at least two different acrylic liquid oligomers as well curing and blowing agents and at least two radical producing means, capable to provide radicals, required for polymerization of the oligomers upon exposing the composition to ambient temperature or to UV or IR laser radiation.

The first oligomer (further referred to as FO) is 3–4 functional oligoester with terminal acrylic or metacrylic groups and the second oligomer (further referred to as SO) is two-functional oligomer with at least 2 hydroxyurethane groups and with at least two terminal acrylic or metacrylic groups.

In accordance with the invention it has been empirically revealed, that when only two oligomers are present in the composition their weight ratio WR should be kept as follows:

$$WR=FO/SO=(1/0.05)-(1/0.2).$$

The second oligomer of the composition is produced by a reaction between a urethane diol with a metacrylic or acrylic anhydride, while the urethane diol is produced, in its turn, by a reaction between an alkylencyclocarbonate with an aliphatic or cycloaliphatic primary diamine.

It is advantageous if the composition comprises also a third oligomer, which is capable to improve adhesion ability of the composition after it is foamed. As suitable modifying oligomer commercially available functional acrylic oligomer can be used, e.g. polybutadiene dimethylacrylate CN 301, acrylated polyester adhesion promoter CN 704, sarcryl functional acrylic oligomer CN 817—all produced by Sartomer Company Inc., USA.

The composition of the invention also comprises at least two blowing agents, initiators of photo-polymerization and may comprise other functional additives, e.g. surfactants, peroxides, activators etc.

The first blowing agent is an organic substance, capable to decompose at a temperature of not more than 120 deg. C. with liberation of a gas and the second blowing agent is an organic liquid with boiling point not less than 45 deg. C.

In practice the first oligomer of the composition is selected from the group comprising ready for use commercially available substances, e.g. polyester tetraacrylate (e.g. product CN 292, manufactured by Sartomer, Inc., USA), trimethylolpropantrimetacrilate, pentaerythriol triacrylate, polyester tetraacrylate and their combination.

Figure 1:
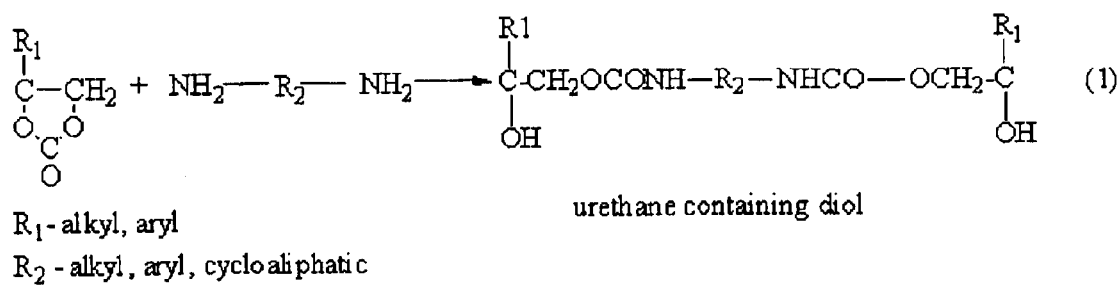
FIGS. 1 and 2 respectively refer to a first and second stage of a chemical process used for synthesizing of acrylic urethane oligomer of the composition of the present invention.
Figure 2:
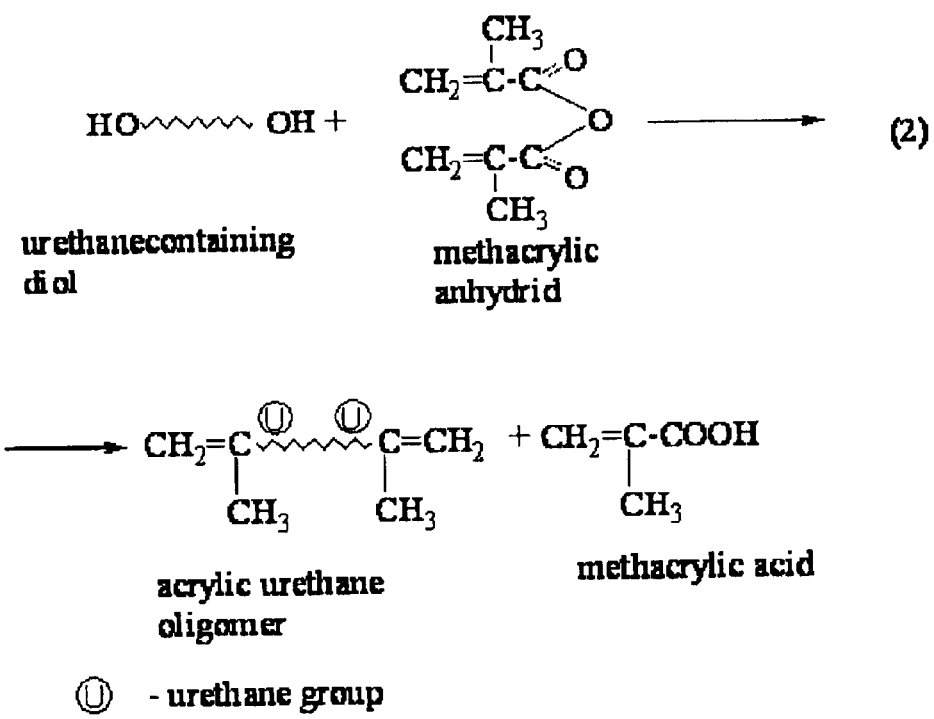

The second oligomer is synthesized by a chemical reaction, carried out in two consecutive stages. At the first stage an urethane containing diol is prepared by interaction of an alkylene carbonate (e.g. propylene carbonate, ethylene carbonate, 1,2-butylene carbonate, cyclocarbonate of 2-ethylhexyl glycidyl ether) with an aliphatic or cycloaliphatic primary diamine (e.g. trimethylhexamethylendiamine, pentamethylenediamine, m-xylylendiamine, isophorondiarnine, hexaamethylenediamine, methylpentamethylenediamine, 1,3-dianinopentan, trioxyethylenediamine). At the second stage an, oligomer, which contains acrylic urethane groups is prepared from the urethane containing diol by reaction with the acrylic or methacrylic anhydride. With reference to FIGS. 1 and 2 the above stages are presented. It can be readily appreciated that the resulting oligomer, containing in its molecule at least two urethane groups is obtained without employing of any isocyanate component in the course of the synthesis.

In practice the first stage is carried out at 70–85 deg. C., for 3–7 hours and at atmospheric pressure. The second stage is conducted at 100–125 deg. C. for 4–5 hours.

As suitable first blowing agent one can use any suitable organic substance capable to liberate gaseous phase due to chemical reaction. In practice the organic substance is selected from the group comprising 2,2'-azodi(2-methylbutyronitrile, 2,2'-azodi(isobutyronitrile), 1,1'-azobis-(cyclohemanecarbonitrile), 2,2'-azobis-(2-methylpropaneritrile), 2,2'-azobis-(2,4-dimethylpentanenitrile), 2,2'-azobis-(2-methylbutanenitrile), benzenesulfonyl hydrazide, chlorobenzenesulfulfozide, N,N'-dimethyl-N,N'-dinitrosoterephtalamide, 2,4,6-trimethylbenzophenone and their combination. The second blowing agent is selected from the group comprising pentane-I5 containing freons, fluorine-contained freons and their combination. An additional source of gas can be also used in the composition, e.g. it can be saturated by carbon dioxide or by other inorganic gas.

As first radical producing means suitable for photo-polymerization of the oligomers one can use any commercially available benzophenone-containing organic substance, e.g. 2,4.6-trimethylbenzophenone, 4-methylbenzophenone, 2-methylbenzophenone, oligo{2-hydroxy-2-methyl-1-[4-(1-methyl)phenyl]propane} and their commercial mixtures. In practice it might be advantageous to use such commercial products as TZT, SarCure SR1129 and SarCure 1137, manufactured by Sartomer Company, USA and Benacure 651, manufactured by Mayzo, Inc. USA. Radical co-polymerization can be promoted if at least one activator of polymerization is present in the composition. Such polymerization activators are known per se and they comprise acrylic amine containing oligomers, salts of Cu and Zn, Vanadium oxide and their combination.

In accordance with the invention the composition comprises also a second radical producing means, which is capable to function as a curing agent. Suitable second radical producing means is selected from the group comprising peroxides, such as dibenzoyl peroxide, methylethylketone peroxide, cylcohexanone peroxide and their combination.

In practice the composition of the invention is prepared by mixing of all required ingredients in a suitable mixer, which allows mixing without entrapping oxygen from the ambient air. Laboratory stirrer ES, produced by VELP Scientifica (Italy) can be used for this purpose. Upon mixing the composition is transferred within a closed container and is saturated by carbon dioxide or other gaseous propellant under pressure 3–7 bars. As suitable container one can use so-called pressurized dispensers.

The above process is similar to the known in the art processes, which are used for manufacturing of commercially available one-component foam sealants.

Now with reference to non-limiting examples and tables below it will be explained in more details how the composition of the present invention is prepared.

Stage 1, Preparation of Urethane Diols.

Various urethane diols were synthesized from commercially available cyclocarbonates (CC) and diarnines (DA) within a reactor-mixer at conditions given in table 1.

TABLE 1

| Cyclocarbonate CC | Diamine DA | Conditions | Molar Ratio CC/DA |
|---|---|---|---|
| 1/1 Propylene carbonate (Jeffsol PC, Autsman) | Trimethyl-hexamethylene diamine (Creanova) | 80° C. 3 hours | 2:1 |

TABLE 1-continued

| Cyclocarbonate CC | Diamine DA | Conditions | Molar Ratio CC/DA |
|---|---|---|---|
| 1/2 1,2 Butylene carbonate (Jeffsol BC, Autsman) | Pentanethylene diamine (Du Pont) | 80° C. 3 hours | 2:1 |
| 1/3 Ethylene carbonate (Jeffsol EC, Autsman) | Isopharon diamine (BAASF) | 120° C. 3 hours | 2:1 |
| 1/4 Cyclocarbonate of 2-ethylhexyl glycidyl ether (CVC, Chemonol Ltd.) | Trimethylhexa-methylene diamine (Creanova) | 80° C. 4 hours | 2:1 |

Stage 2, Preparation of Urethane-containing Bi-functional (met)Acrylic Oilgomers.

Various oligomers were synthesized from the above listed urethane diols and acrylic or methacrylic anhydride within a reactor-mixer at conditions given in table 2.

TABLE 2

| | Urethane diol | Anhydride | Conditions | Functionality |
|---|---|---|---|---|
| 2/1 | 1/1 from table 1 | Methacrylic (Polyscience, Inc) | 105° C. 5,5 hours | 2 |
| 2/2 | 1/2 from table 1 | Methacrylic (Polyscience, Inc.) | 110° C. 4,5 hours | 2 |
| 2/3 | 1/3 from table 1 | Acrylic (Polyscience, Inc.) | 110° C. 5 hours | 2 |
| 2/4 | 1/4 from table 1 | Acrylic (Polyscience, Inc.) | 110° C. 5 hours | 2 |

The composition of the invention was prepared by mixing of the oligomers prepared in the previous stages with the other ingredients. All ingredients were mixed during 30 minutes in the above-mentioned laboratory mixer at ambient temperature. After mixing the liquid mixture was placed in a closed container and saturated by carbon dioxide supplied to the container under pressure of about 5 Bar. The content of the composition according to its various embodiments is summarized in non-limiting table 3, which is presented in FIG. 3. The amounts of the ingredients are indicated in weight percent.

Figure 4:
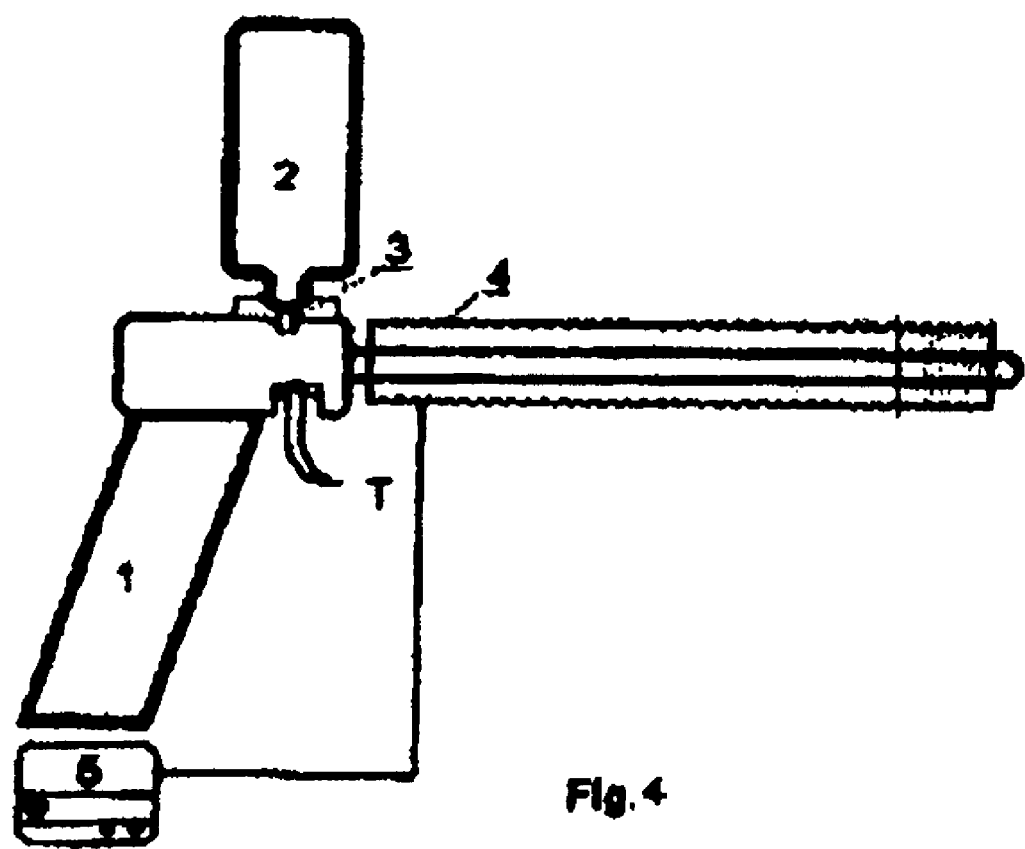
FIG. 4 shows schematically an apparatus, which can be used for photo-polymerization of the composition of the present invention.

After storage during 14 days the composition was used in filling application. For this purpose a laser apparatus shown in FIG. 4 was used. The apparatus comprises a pistol grip configured holder 1 provided with a handle portion, which is graspable by operator's hand. The upper portion of the apparatus is adapted to carry a container 2 with liquid composition saturated by the gaseous medium. The upper portion of the apparatus is provided with a tubular duct 4, which can be brought in fluid communication with the container by virtue of a nipple 3, which position is controlled by a trigger T. It can be readily appreciated, that since the composition is saturated by pressurized gaseous medium it is forced to emerge from the container and to advance through the duct outside. An oscillator laser surrounds the duct and is electrically connected to a generator 5. Instead of laser a UV lamp can be used. By virtue of this provision the composition in the duct can be exposed either to IR or UV radiation. In practice ND JAG laser with power of 10 W, manufactured by $mC^2$ (Israel) can be used for producing of IR radiation with wavelength of 1.06 micron As suitable UV lamp one can use Litex 682 lamp manufactured by Dentamerica (USA). This lamp is capable to produce radiation with wavelength 360–420 nanometers.

As soon as the liquid composition emerges from the container it readily foams. Due to simultaneous exposure to IR or UV radiation the foam undergoes photo-polymerization, which cures the foam and renders it strong. The obtained foam can be conveniently used for filling cavities, gaps, cracks, joints etc. in various sealing applications.

Mechanical properties of the foamed structure obtained with the aim of the above-described apparatus were measured. Among the measured properties were density (measured according to ASTM DI622), tensile strength (measured according to ASTM D1623) and elongation at break (measured according to ASTM D638M).

The obtained properties are summarized in a non-limiting table 4 below.

TABLE 4

| Number of composition from table 3 | Density, kg/m$^3$ | Tensile strength, MPa | Elongation at break, % |
|---|---|---|---|
| 1 | 600 | 2.9 | 50 |
| 2 | 650 | 2.2 | 60 |
| 3 | 270 | 3.2 | 80 |
| 4 | 300 | 3.4 | 60 |

According to data presented in table 4 the proposed laser curable one-component foamable composition is suitable for use in sealing applications since it has good service properties. The composition is simple, it can be easily and conveniently prepared and it is inexpensive.

It has been found, however, that if the content of the composition is different from the above-listed examples, than either the service properties are not sufficient for sealing or the composition becomes expensive.

The proposed one-component laser curable acrylic sealant composition can be utilized in numerous civil and military applications for sealing of structures.

It should be appreciated that the present invention is not limited by the above-described embodiments and that one ordinarily skilled in the art can make changes and modifications without deviation from the scope of the invention as will be defined below in the appended claims.

In the following claims the term comprising means "including" but not limited to.

It should also be appreciated that features disclosed in the foregoing description, and/or in the foregoing drawings, and/or examples, and/or tables, and/or following claims both separately and in any combination thereof, are material for realizing the present invention in diverse forms thereof.

What is claimed is:

1. A foamable, photo-polymerizable liquid composition comprising:
    a) at least two acrylic-based reactionable oligomers,
    b) at least a first and a second radical producing means, capable to liberate radicals, required for polymerization of said oligomers upon exposing the composition respectively to a light or to ambient temperature,
    c) at least a first and a second blowing agent, capable to supply a gas medium for foaming the liquid composition,
wherein said at least two acrylic-based reactionable oligomers comprise a first oligomer, being at least three functional oligoester provided with terminate acrylic groups and a second oligomer, being two fuctional oligomer provided with at least two urethane groups and at least two terminate acrylic and/or methacrylic groups, and wherein the weight ratio between the said first and said second oligomer lies betveen 1:0.5 to 1:0.2.

2. The foamable photo-polymerizable composition, as defined in claim 1, in which the first radical producing means is selected from the group comprising of 2,4,5-trimethylbenzophenone, 4-methylbenzophenone, 2-methylbenzophenone, oligo{2-hydroxy-2-methyl-1[4-(1-methyl)phenyl]propane} and their combinations, the second radical producing means is a peroxide and said light is UV or IR light.

3. The composition of claim 1, wherein the first blowing agent comprises an organic substance capable to decompose at a temperature of not more than 120° C. with liberation of a gas, while the other blowing agent comprises an organic liquid, which boiling point is at least 45° C.

4. The composition of claim 3, in which the first blowing agent is selected from the group comprising of 2,2'-azodi (2-methylbutyronitrile), 2,2'-azodi(isobutyronitrile), 1,1'-azobis-(cyclohemanecarbonitrile), 2,2'-azobis-(2-methylpropanenitrile), 2,2'-azobis-(2,4-dimethylpentanenitrile), 2,2'-azobis-(2-methylbutanenitrile), benzenesulfonyl hydrazide, chlorobenzenesulfulfozide, N,N'-dimethyl-N,N'-dinitrosoterephtalamide, 2,4,6-trimethylbenzophenone and their combinations, the second blowing agent is selected from the group comprising pentane and fluorine freons.

5. The composition of claim 1, which comprises at least one activator, capable to promote co-polymerization of the first and second oligomer.

6. The composition of claim 5, in which said activator is selected from the group, comprising an acrylic amine containing oligomer, a salt of copper, a salt of Zinc, vanadium oxide and their combination.

7. The composition of claim 2, wherein the second oligomer is a product of reaction of urethane diol with metacrylic or acrylic anhydride.

8. The composition of claim 7, wherein the urethane diol is a product of reaction of an alkylencyclocarbonate with an aliphatic or cycloaliphatic primary diamine.

9. The composition of claim 1, which comprises a third oligomer, capable to improve adhesion ability of the composition after it is foamed.

10. The composition of claim 9, in which said third oligomer is a functional acrylic oligomer.

11. A sealant, based on acrylic composition of claim 1, said sealant being stored in a closed container.

12. The sealant of claim 11, in which said container contains a gas medium under pressure of about 5 bars, said gas medium is distributed within the composition.

* * * * *